United States Patent Office 2,855,316
Patented Oct. 7, 1958

2,855,316

BORON NITRIDE SHAPES AND METHOD OF MAKING

Kenneth M. Taylor, Lewiston, N. Y., assignor to The Carborundum Company, Niagara Falls, N. Y., a corporation of Delaware No Drawing. Application March 3, 1954
Serial No. 413,967

6 Claims. (Cl. 106—39)

This invention relates to the manufacture of molded shapes of boron nitride. It further concerns the preparation of a boron nitride-containing raw mix which is particularly adaptable for the molding of shaped articles, and methods of forming the raw mix into the desired shapes by hot pressing. It also pertains to the articles made therefrom.

This application is a continuation-in-part of my co-pending application Serial No. 288,553, now Patent No. 2,808,413.

Boron nitride satisfactory for molding can be made by mixing an oxygen-containing boron compound, such as various boric acids (including anhydrous boric acid), with an acid soluble material which at the temperatures encountered in nitriding will not fuse or vaporize and is substantially inert to the boron compound, ammonia, and the reaction products, such as tricalcium phosphate, and heating the mixture in an atmosphere of ammonia at a controlled temperature around 900° C. for several hours. The mixture of raw materials is preferably pelletized by moistening with water and forming into porous pellets or agglomerates such as by forcing the moistened mixture through a coarse mesh screen and drying prior to the nitriding operation. The reaction product is crushed and treated with acid to remove the tricalcium phosphate or other extraneous material, washed with water and filtered. A final washing with 95% alcohol is also preferred. I have found that if the nitriding operation is carried out at too high a temperature for too long a time the resulting boron nitride material cannot be satisfactorily hot pressed, and if the nitriding is done at too low a temperature the resulting product is too soluble in acids and cannot be satisfactorily separated from the other products of the reaction. The temperature of nitriding, therefore, should be maintained around 900° C. for optimum results, although successful nitriding to form hot pressable material has been carried on at temperatures from 800° C. to 1100° C.

Boron nitride material satisfactory for molding shaped bodies of boron nitride can also be made by a process similar to that already described but in which, instead of mixing the boric acid or boric oxide with tricalcium phosphate, the boric acid or boric oxide is mixed with previously made boron nitride. This latter process avoids the requirement of an acid treatment.

The boron nitride material made by either of the above-described processes can be molded per se into various shapes without use of extraneous bond by hot molding procedures. However, despite the fact that substantially all alcohol- and water-soluble materials, such as free boric oxide, have been removed from the initial boron nitride material by washing with water and alcohol before molding, the resultant boron nitride bodies have poor resistance to water and alcohol, rapidly disintegrating when submerged in water and containing up to about 20% alcohol-soluble material which apparently is free boric oxide. This is true even if an inert or reducing atmosphere is maintained during hot pressing of the boron nitride bodies.

It is therefore an object of the present invention to provide hot molded boron nitride bodies which have superior resistance to attack by water.

It is a still further object to provide hot molded boron nitride bodies which contain decreased amounts of alcohol-soluble material.

It is a further object to provide raw mixes for molding boron nitride bodies which raw mixes have improved molding properties.

Other objects and advantages accruing from the present invention will become obvious as the description proceeds.

In accordance with the present invention, it has been found that stabilized hot pressed boron nitride bodies can be made by molding raw mixes comprising besides the boron nitride material small amounts of a stabilizing material which will form with boric oxide under the conditions of subsequent manufacture a water- and alcohol-insoluble material. Raw mixes comprising, besides boron nitride material, small amounts of an alkaline earth compound, such as a phosphate, carbonate, sulfate or oxide of calcium, barium, strontium, magnesium or mixtures thereof, give, upon hot pressing, bodies having excellent resistance to water and alcohol, the alcohol-soluble content of these bodies being markedly decreased in comparison with bodies hot pressed from the boron nitride material alone. Compounds of the rare earths are also relatively effective as stabilizing additives to the boron nitride-containing raw mixes to produce water- and alcohol-resistant hot pressed boron nitride bodies. Materials which form an insoluble solid solution with boric oxide are also effective to a certain degree.

In order that the invention may be more fully understood, the following specific examples are given:

Boron nitride satisfactory for subsequent hot pressing was made by dry mixing 5320 grams of a commercial grade of boric acid (equivalent to 3000 grams of boric oxide) and 3000 grams of a commercial grade of precipitated tricalcium phosphate. The mixture was made into a stiff paste by the addition of approximately 4000 ml. of tap water and then pelletized or agglomerated by pressing through a 4-mesh sieve. The resulting small agglomerates of material were dried for two hours at 200° F. followed by drying for three hours at 320° F. The dried pellets were then nitrided by heating in an atmosphere of ammonia in a graphite-lined electric muffle furnace for nine hours at 900° C.

After nitriding, the pellets were ground to a sufficient fineness to pass through a 60-mesh screen and then treated to dissolve the tricalcium phosphate and other extraneous material, such as any free boric oxide or boric acid present in the reaction mix. The material was first leached in dilute hydrochloric acid prepared by mixing five liters of concentrated acid and seventeen and one-half liters of water. The material was kept in the hydrochloric acid, with occasional stirring, for eight hours. It was then allowed to stand overnight to settle the undissolved boron nitride, after which the acid solution was decanted off and a mixture of two liters of concentrated hydrochloric acid and ten liters of water added and occasionally stirred for three hours. After standing for a few hours to allow the solids to settle, the acid solution was decanted off. The undissolved boron nitride was washed several times by decantation with tap water and then with distilled water. The solids were filtered on a Buchner funnel, washed several times with hot 95% alcohol and dried overnight at room temperature followed by a final drying at 300° F. for two hours. After this treatment the product contained no substantial amount of free boric oxide.

A typical analysis of the recovered boron nitride material is as follows:

ANALYSIS OF BORON NITRIDE

| Constituent: | Amount, Percent |
| --- | --- |
| Boron | 41.45 |
| Nitrogen | 44.00 |
| Free boric acids (calculated as $H_3BO_3$) [1] | .75 |
| Silica | .28 |
| Calcium | Trace |
| Phosphate ($PO_4$) | Trace |
| Material volatile at 110° C | .26 |

[1] Probably present as a mixture of acids such as $HBO_2$, $H_2B_4O_7$ and $H_3BO_3$.

Boron nitride was identified in the resulting material by X-ray diffraction analysis, no other lines than those of boron nitride being found in the diffraction pattern. The material so made is a finely divided, bulky, white powder and electron micrographs of the material indicate that the individual crystals are 0.5 micron and finer in size. The crystal size and chemical inertness increase on heating to higher temperatures during nitriding. The material has a specific gravity of about 2.21.

Having made a quantity of the powdered boron nitride material according to the process set forth above, small shapes such as cylinders 1¼" long and ⅞" in diameter were made by hot pressing as follows:

An Ajax high frequency electric furnace was used for hot pressing. It had a graphite crucible heating chamber which was cylindrical in form, with an inside diameter of 4" and a length of about 11". The top of the crucible during use was closed by a graphite block and powdered carbon except for an opening ½" in diameter through which temperature readings were made and an opening through which a graphite mold plunger passed. Since the heating chamber was graphite, the furnace chamber was considered to be in a reducing atmosphere at high temperatures, consisting chiefly of carbon monoxide and nitrogen.

The raw mix for the boron nitride bodies was made by intimately mixing tricalcium phosphate and boron nitride material prepared as described above, the tricalcium phosphate constituting about 10% by weight of the raw mix.

The raw mix was pressed into cylindrical graphite molds. Each mold had two movable graphite plungers. The raw mix in loose powdered condition was placed in the mold by compressing slightly as the mold was filled. Pressure was applied to the plungers and maintained throughout the heating and cooling periods.

It was found that best results were obtained using a pressure in the neighborhood of 400 pounds per square inch or higher, although articles of satisfactory hardness and strength were obtained using pressures as low as 250 p. s. i. The apparent density of the bodies increased as the pressure increased, having an average apparent density at 250 p. s. i. of about 1.87 g./cc. and at 500 and 1000 p. s. i. of about 2.01 g./cc. Articles pressed at pressures below 250 p. s. i. were considerably softer and of much lower density.

Maximum or peak molding temperatures ranging from 1500° C. to 2200° C. were tried. It required about 1¼ to 1¾ hours to reach maximum temperature which was then held until there was no further downward movement of the plunger, thereby indicating that the article had been compressed to the maximum density for that temperature and pressure. With a pressure of 500 pounds per square inch, no holding period was usually required at temperatures of 1900° C. or higher, while at 1500° C. the holding period was usually around twenty minutes.

Strong hard bodies were obtained by pressing in the temperature range from 1500° C. to 1900° C. Within these limits the optimum pressing temperature, using a pressure of around 500 pounds per square inch, varied somewhat with the particular batch of boron nitride. The hardness of the hot pressed pieces increased with density. The sandblast penetration on the bodies hot pressed in the range from about 1500° C. to 1800° C. was only about 0.005–0.010 of an inch, as compared to the standard penetration of 0.010 of an inch on plate glass, using the same test.

Bodies comprising boron nitride hot pressed as above described in the temperature range of 1500° C. to 1900° C. and at 500 pounds per square inch or higher are white and have an ivory-like appearance and a smooth, graphite-like feel. They are readily machinable and for a ceramic material are quite strong in compression. The compressive strength at room temperature of a representative body is about 40,000 pounds per square inch. The apparent density averages about 2 grams per cc. The bodies have good resistance to oxidation and thermal shock. The alcohol-solubility content of bodies hot pressed from mixes containing 10% of tricalcium phosphate as a stabilizing agent was on the average only about 0.63% as compared to 15–20% for bodies hot pressed from raw mixes which contain no stabilizing material.

Hot pressed boron nitride bodies made in accordance with the above-described method have also been made using materials other than tricalcium phosphate as the additive to the raw mix. The following table shows the effectiveness of various amounts of tricalcium phosphate and other compounds in controlling the amount of alcohol-soluble material in the resultant hot pressed bodies.

Table I

| Sample No. | Additive, Percent by Weight | Content of alcohol-soluble material (calculated as $B_2O_3$) after hot pressing, percent by weight |
| --- | --- | --- |
| 1 | no additive | 15–20 |
| 2 | 5% $Ca_3(PO_4)_2$ | 5.6 |
| 3 | 10% $Ca_3(PO_4)_2$ | 0.63 |
| 4 | 5% $CaCO_3$ | 5.0 |
| 5 | 10% $CaSO_4$ | 2.5 |
| 6 | 10% $BaCO_3$ | 1.5 |
| 7 | 6% $Y_2O$ | 9.1 |
| 8 | 10% mullite ($Al_2O_3:SiO_2$) | 11.4 |

The test results tabulated above clearly show that the alcohol-soluble content of the bodies hot pressed from boron nitride made by the above-described processes is substantially lowered by the addition to the hot press raw mix of various stabilizing materials. Tests have shown that in general alkaline earth compounds are the most effective in lowering the alcohol-soluble content of the resultant hot pressed boron nitride bodies, an addition of about 10% by weight of most of these compounds being very effective when using boron nitride made by one of the above-described processes. Similar amounts of rare earth compounds are also relatively effective as stabilizing agents. The amount of additive to be used depends upon the purity of the initial boron nitride material, the desired resistance of the product to water and alcohols, and the molecular weight of the particular additive, in most instances 10% by weight or less being sufficient to yield a highly water- and alcohol-resistant body. The bodies made in accordance with samples Nos. 3, 5 and 6 of Table I exhibit excellent resistance to alcohol and water, being capable of being submerged in either water or alcohol for sustained periods of time without disintegrating or being affected to any great extent by the water or alcohol. Consequently, these hot pressed stabilized boron nitride bodies are satisfactory for many uses for which hot pressed unstabilized bodies made from the initial boron nitride per se are highly unsatisfactory. The bodies made in accordance with samples 2, 4, 7 and 8 of Table I are also superior for many uses where exposure to water or alcohol is somewhat limited or where a controlled amount of the alcohol-soluble material is desirable in the final product because of the particular characteristics of the product, such as electrical properties.

While it is not known just why the hot pressed boron nitride bodies made without the use of a stabilizing agent contain a substantial amount of alcohol-soluble material despite the fact that all such material is removed from the boron nitride before molding and the bodies are fired in an inert atmosphere, it is theorized that although the boron nitride material as initially made contains practically no free boric oxide, some oxidic boron material is present combined either physically or chemically in some way so as to be insoluble in water and alcohol. X-ray diffraction analysis of the initial boron nitride material sheds no light on this question, there appearing no lines in the diffraction pattern other than those of boron nitride. However, the analysis in Table I clearly shows that some boron compound other than boron nitride of the chemical formula BN is present in the boron nitride material made as above described. Forty-four percent of nitrogen will combine to form boron nitride having the chemical formula BN with only about thirty-four percent of boron. Therefore, in the material analyzed there was about 7.5 percent of boron present which was not in the form of boron nitride. No oxygen determination having been run, it appears highly probable that this 7.5% boron was in some way combined with oxygen in an oxidic form which is insoluble in water and alcohol. It is further theorized that upon firing at sufficiently high temperatures such as those reached during hot pressing this insoluble oxidic boron material is released in the form of a soluble oxidic boron compound, such as boric oxide. Based upon this theory, it is believed that any stable material capable of forming under the conditions of manufacture, such as hot pressing at 1500° C. and above, a water- and alcohol-insoluble material with boric oxide will perform satisfactorily as a stabilizing additive to include in the boron nitride-containing raw mixes to reduce the amount of alcohol- and water-soluble material in the resultant hot pressed bodies. Consequently, the inclusion in the raw mixes of all such materials are considered to be within the scope of the present invention, the preferred practice being to use an alkaline earth compound as the additive to the raw mixes for forming boron nitride bodies by hot pressing.

It is impossible to say with certainty just what is the composition of the bodies pressed from the present raw mixes. However, in view of the probability that the excess boron in the initial boron nitride material is in an oxidic form, it is probable that the additives in the present raw mixes react with the alcohol-soluble material liberated or formed during firing to form insoluble boron compounds, such as alkaline earth borates or rare earth borates. This is supported by the fact that where alkaline earth phosphates, carbonates and sulfates are used as the additive oxides of phosphorus, sulfur and carbon are apparently liberated, there being no substantial amounts of phosphorus, sulfur or carbon in the resultant body. At any rate it can be said with fair certainty that the present bodies comprise essentially boron nitride in a predominant proportion and a water- and alcohol-insoluble material comprising boron and a metal of the additive material. The material other than boron nitride probably also comprises, along with boron and a metal of the additive material, oxygen. If the additive material is an alkaline earth or rare earth compound the resultant bodies probably comprise boron nitride and a water- and alcohol-insoluble material comprising boron and either an alkaline earth metal or rare earth metal, the bodies very likely comprising boron nitride and a water- and alcohol-insoluble alkaline earth or rare earth borate. If the additive is a material which, instead of chemically reacting with boric oxide, forms an insoluble solid solution therewith, the resultant bodies probably comprise besides boron nitride a solid solution comprising boron and the additive material, likely boric oxide and the additive material.

The exact conditions and requirements for making a boron nitride-containing raw mix which can be hot pressed has been set forth herein, as well as the exact steps and conditions to follow to carry out successfully the hot pressing of stabilized boron nitride bodies which contain decreased amounts of water- and alcohol-soluble material. In setting forth those various conditions and requirements, a number of heretofore unknown and unrecognized factors which are highly critical to a satisfactory carrying out of the present invention, namely, the molding of bonded stabilized boron nitride bodies of acceptable strength, hardness and resistance to water and alcohol have been pointed out. For example, it has been pointed out that when the boron nitride material is formed it is essential that the temperature of formation be closely controlled and kept at a relatively low temperature in the neighborhood of 900° C. or thereabouts. Boron nitride made by heating at substantially higher temperatures for too long a time is usually unsatisfactory for hot pressing. The optimum pressures for molding hard dense boron nitride bodies have also been disclosed.

Bodies hot pressed in accordance with the present invention are suitable for uses such as high temperature bearings, rocket motor combustion chamber and exhaust nozzle linings, high temperature crucible and other refractory articles, various types of electrical insulators and the like.

Having described the invention in detail, it is desired to claim:

1. A shaped article of manufacture consisting essentially of the reaction product of 5 to 10% by weight of an alkaline earth metal compound selected from the group consisting of phosphates, carbonates, sulfates, oxides and mixtures thereof, and a boron nitride material formed by heating a mix comprising boric acid at a temperature of 800° C. to 1100° C. in an atmosphere of ammonia, said article having an apparent density of about 2 g./cc. and being resistant to attack by water.

2. A shaped article of manufacture according to claim 1 in which the alkaline earth metal compound is tricalcium phosphate.

3. A raw mix for the formation of molded boron nitride bodies consisting essentially of boron nitride formed by heating a mix comprising boric acid at a temperature of 800° C. to 1100° C. in an atmosphere of ammonia and having a maximum individual crystal size of about 0.5 microns and 5 to 10% by weight of an alkaline earth metal compound selected from the group consisting of phosphates, sulfates, carbonates, oxides and mixtures thereof.

4. A raw mix according to claim 3 in which the alkaline earth metal compound is tricalcium phosphate.

5. A method of making boron nitride bodies which comprises selecting a raw mix consisting essentially of 5 to 10% by weight of an alkaline earth metal compound selected from the group consisting of phosphates, sulfates, carbonates and oxides of alkaline earth metals and a boron nitride material formed by heating a mix comprising boric acid at a temperature of 800° C. to 1100° C. in an atmosphere of ammonia, placing said raw mix in a mold and heating the mold and contents under pressure to a temperature of from 1500° C. to 1900° C. to form the desired body.

6. A method of making boron nitride bodies which comprises selecting a raw mix consisting essentially of 5 to 10% by weight of tricalcium phosphate and boron nitride material formed by heating a mix comprising boric acid at a temperature of 800° C. to 1100° C. in an atmosphere of ammonia, placing said raw mix in a mold and heating the mold and contents under pressure to a temperature of from 1500° C. to 1900° C. to form the desired body.

References Cited in the file of this patent

UNITED STATES PATENTS

| | | |
|---|---|---|
| 1,991,204 | Grenagle | Feb. 12, 1935 |
| 2,106,578 | Schwartzwalder et al. | Jan. 25, 1938 |
| 2,636,825 | Nicholson | Apr. 28, 1953 |

FOREIGN PATENTS

| | | |
|---|---|---|
| 483,201 | Great Britain | Apr. 13, 1938 |
| 357,122 | Great Britain | Sept. 14, 1931 |

OTHER REFERENCES

Mellor: "Comprehensive Treatise on Inorganic and Theoretical Chemistry," 1924, vol. 5, page 45.

Finlay et al.: "Bulletin of the American Ceramic Society," vol. 31, No. 4, pages 141–143 (1952).

UNITED STATES PATENT OFFICE
CERTIFICATE OF CORRECTION

Patent No. 2,855,316            October 7, 1958

Kenneth M. Taylor

It is hereby certified that error appears in the above numbered patent requiring correction and that the said Letters Patent should read as corrected below.

Column 1, line 25, for "2,808,413" read -- 2,808,314 --.

Signed and sealed this 25th day of September 1962.

(SEAL)
Attest:

ERNEST W. SWIDER
Attesting Officer

DAVID L. LADD
Commissioner of Patents